May 16, 1933. J. PEARLMAN 1,909,868
CUTTING MACHINE
Filed Nov. 21, 1929 3 Sheets-Sheet 2

INVENTOR
Julius Pearlman
BY
ATTORNEYS

May 16, 1933.  J. PEARLMAN  1,909,868
CUTTING MACHINE
Filed Nov. 21, 1929   3 Sheets-Sheet 3
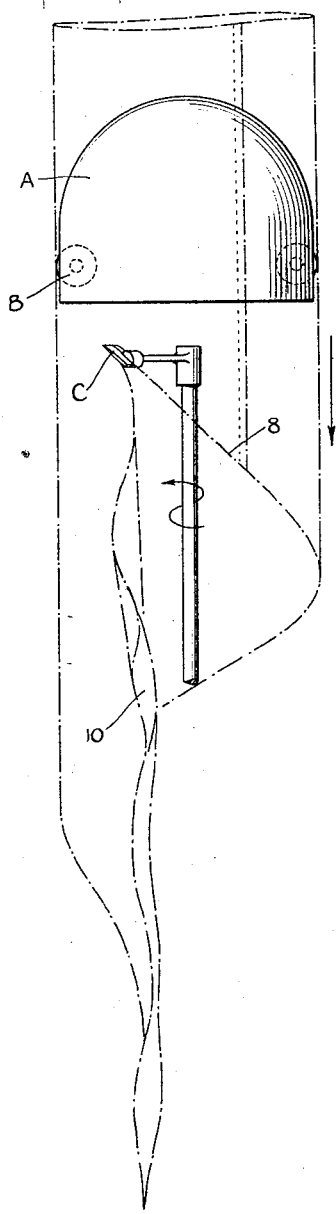
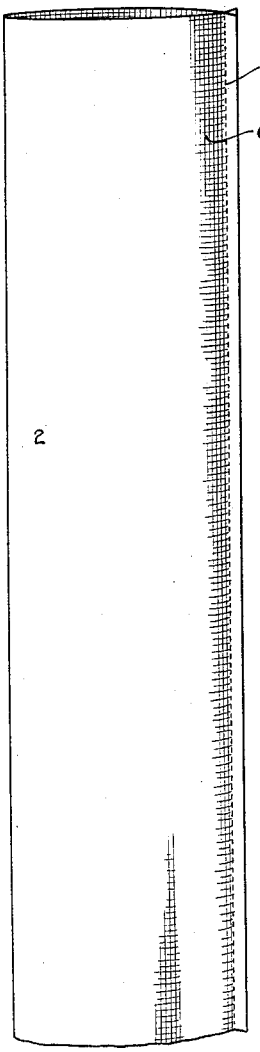
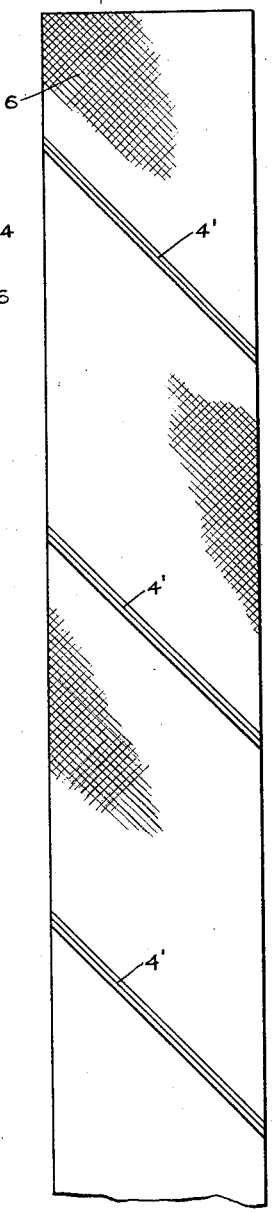
INVENTOR
Julius Pearlman
BY
ATTORNEYS Patented May 16, 1933

1,909,868

UNITED STATES PATENT OFFICE

JULIUS PEARLMAN, OF LYNBROOK, NEW YORK

CUTTING MACHINE

Application filed November 21, 1929. Serial No. 408,698.

This invention relates to cutting machines, and more particularly to bias cutting machines for cutting a sleeve or tube of fabric or like material into a continuous strip in which the weave or threads run on the bias.

In order to obtain a strip of material cut on the bias it has heretofore been proposed to take a tubular fabric, or to sew a sheet of fabric to form a sleeve or tubular fabric, in which the threads run longitudinally and transversely, as originally woven, and to cut this sleeve with a spiral cut in order to obtain a continuous strip of material which is cut on the bias. To obtain the desired spiral cut it has been attempted to move the fabric with a longitudinal and simultaneous rotational movement relative to a fixed cutter. This leads to considerable difficulty in handling the fabric and in obtaining the desired accurate relation between the component movements thereof. One object of the present invention resides in the provision of a generally improved and generally simplified bias cutting machine in which the fabric is given only a longitudinal or translational movement, while the desired bias cut is obtained by simultaneously revolving the cutter relative to the periphery of the tubular fabric. The resultant of the component motions is the desired spiral or bias cut and the bias or slope of the cut is determined by the ratio of the rate of movement of the fabric and the rate of revolution of the cutter. My invention is more especially concerned with relatively large strips of material, necessitating that the bias cutting machine be capable of accommodating a tube of material which is relatively large in diameter. Under these circumstances it is difficult to obtain the desired revolution of the cutter about the periphery of the tubular fabric. Accordingly, it is a further object of my invention to provide a bias cutting machine adapted for handling large sleeves of material, and to this end I have devised an arrangement in which the cutting means is arranged to rotate within the tubular fabric. A rotary cutting means is preferably used and is revolved about the axis of the tubular fabric within the periphery thereof.

The slope of the bias cut is determined by the relative rates of movement of the fabric and of revolution of the cutter, and in order to insure that the desired bias will be constantly maintained it is desirable to drive both the feed means for feeding fabric and the means for revolving the cutter from a single source of power. The provision of a bias cutting machine organized as so far described and arranged to be driven from a single source of power is a further object of my invention. To this end my machine comprises in general a fixed shaft extending from a support and a cylindrical forming head fixed to the end of the shaft, the head being rounded at its other end to permit a tubular fabric to be drawn thereover toward the support. A tubular drive shaft is rotatably mounted about the fixed shaft and extends from the support, at which point power from any suitable driving motor is applied thereto, to the head where it is appropriately geared to feed wheels distributed around the periphery of the head. The tubular drive shaft also carries an arm at the end of which a preferably rotary cutter is mounted so that rotation of the tubular drive shaft causes both the revolution of the cutter and the feed of the fabric.

One of the problems which arises in bias cutting machines is to properly protect and collect the finished strip of material. Various complicated schemes have been suggested for automatically reeling up the finished strip of material, but these are complex in construction and satisfactory only for narrow strips of material. For this purpose my machine is arranged with a vertical axis, that is, the axis of the cylindrical forming head is made vertical and is mounted on a fixed upright shaft. The upper end of the forming head is rounded so that the tubular material may be drawn downwardly thereover, and an annular storage magazine is located about the vertical fixed and the rotatable tubular driving shafts previously described, and beneath the forming head of the machine, so that the cut material falls by gravity directly into the magazine in circular formation or convolutions.

Another object of my invention is to facilitate the withdrawal of the cut strip of material from the annular storage magazine, which is done simply by providing means for freely rotatably supporting the said magazine so that the strip of material therein may be removed simply by pulling one end thereof out of the magazine.

To the accomplishment of the foregoing and such other objects as will hereinafter appear, my invention consists in the elements and their relation one to the other as hereinafter are more particularly described in the specification and sought to be defined in the claims. The specification is accompanied by drawings in which:

Fig. 3 is a schematic showing explanatory of the operation of the invention;

Fig. 4 shows a tubular fabric before being run through the machine; and

Fig. 5 represents the strip of bias cut material obtained after the tubular fabric has been run through the machine.

The material or fabric is fed to the machine in the form of a tube or sleeve. It is possible for this sleeve to be provided, in the first instance, without a seam and, in fact, this would be necessary if it were required that the finished bias cut strip also have no seams, but in the more usual case the tubular fabric is formed by folding and sewing a flat web of fabric as is indicated in Fig. 4, in which a fabric 2 has been sewed with a seam 4 in order to form a tubular fabric. It will be observed that the threads 6 of the fabric run longitudinally and transversely just as when initially woven.

The tubular fabric is next fed to the bias cutting machine which, referring to Fig. 3, consists essentially of a forming head A, feed means B for feeding the tubular fabric over the forming head A, and cutting means C arranged to revolve in a single plane about the axis of the tubular fabric and within the periphery thereof. The resultant of the motion of translation of the fabric caused by the feed means B and the revolution of the cutter C is a bias cut, as is indicated at 8, and results in a strip of material which is severed from the tubular fabric, as at 10. The resulting strip of material is represented in Fig. 5 in which it will be observed that the threads of the weave 6 now run on the bias and that the seam 4, if one was employed, now occurs as occasional diagonal seams 4'.

Figure 1:
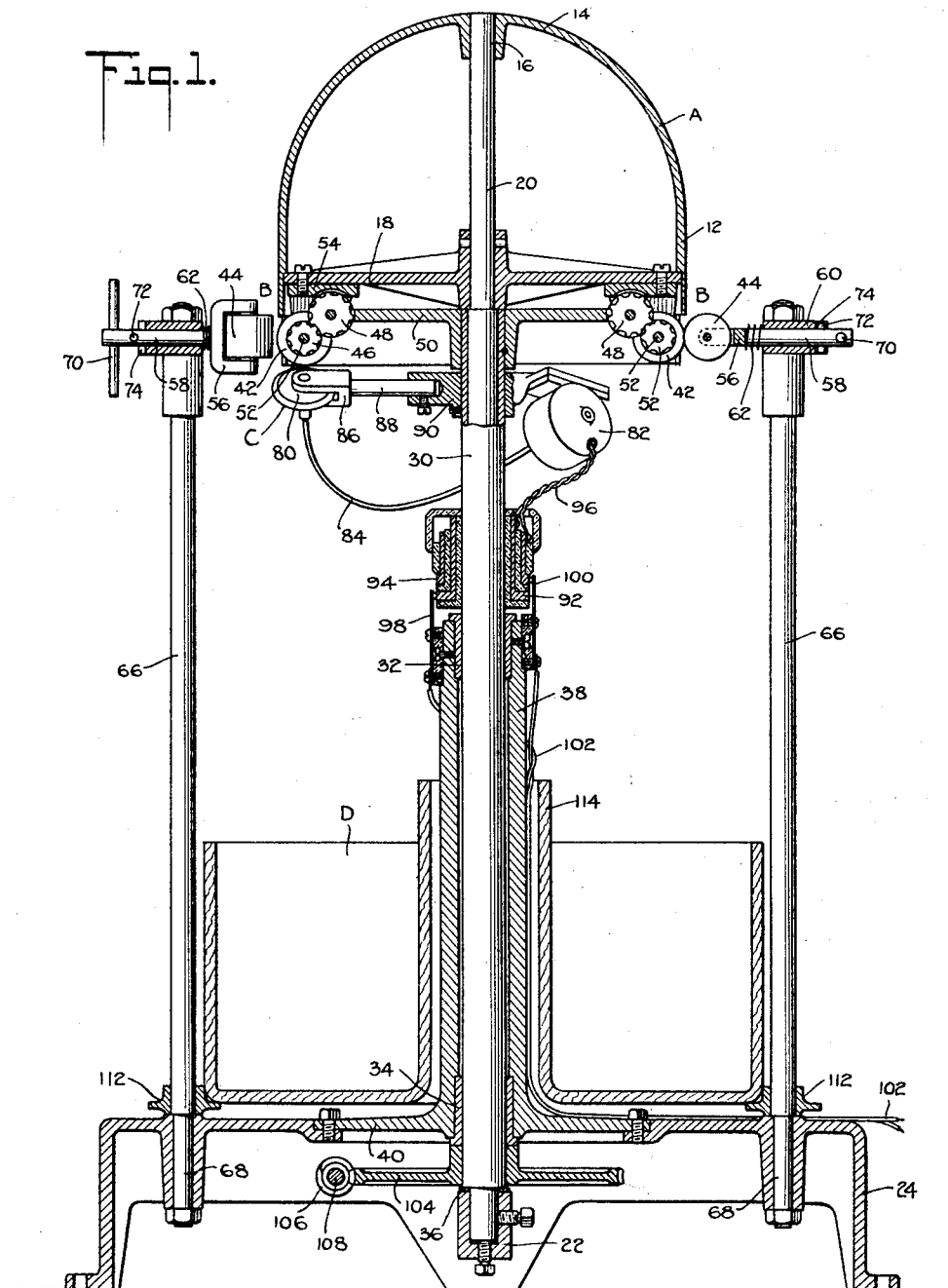
Fig. 1 is an elevational section through a preferred embodiment of my invention.
Figure 2:
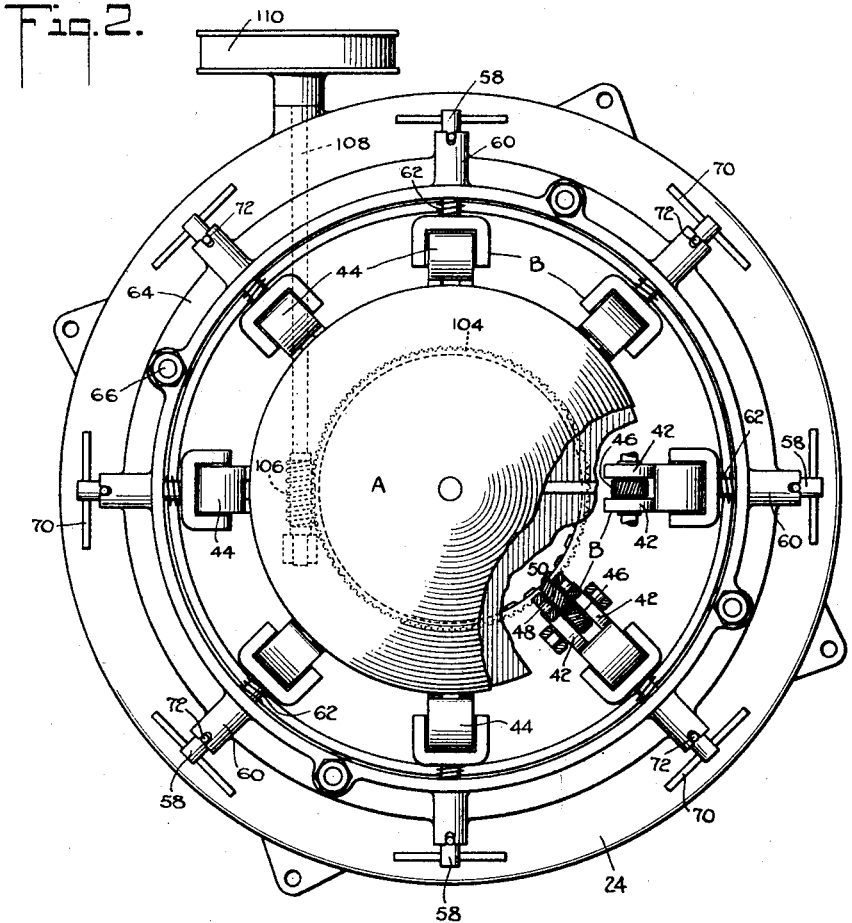
Fig. 2 is a partially sectioned plan view thereof.

A bias cutting machine embodying various features of my invention in a preferred form is illustrated in Figs. 1 and 2 of the drawings.

In these figures A is the forming head, B is the feed means for drawing the tubular fabric downwardly over the forming head A, C is the cutter, and D is a storage magazine for receiving the finished strip of material.

Considered in greater detail, the forming head A consists of a cylindrical portion 12 surmounted by a dome-like or rounded portion 14, so as to present a smooth face over which the tubular fabric may be drawn. The forming head A is supported at 16 and through a disc 18 by a fixed shaft 20, held in an upright position by means of a socket 22 in a supporting base 24, and by further means subsequently to be described.

The fixed shaft 20 is surrounded by a tubular drive shaft 30 which is rotatably and preferably concentrically mounted on the fixed shaft 20. The tubular drive shaft 30 is also supported in top and bottom bearings 32 and 34, and a step or thrust bearing 36. The top and bottom bearings 32 and 34 are carried in an upright tubular pedestal 38, a flange 40 of which is rigidly bolted to the base 24. The pedestal 38 serves to support tubular drive shaft 30 in an upright position and through it to support the fixed shaft 20 in an upright position.

The feed means, generally designated B, comprises feed rollers 42 and pressure rollers 44. The feed rollers 42 are driven by gears 46 meshing with intermediate idler gears 48, themselves meshing with a gear 50 mounted directly upon drive shaft 30. Gears 50 and 48 have helical teeth, and for the sake of simplicity and in order to permit gears 46 to mesh directly with gears 48, gears 46 are also cut with helical teeth.

Gears 46 are fixed to pintles 52, to which the feed wheels 42 are also fixed, and pintles 52 are journalled in brackets 54. Idler gears 48 are also journalled in brackets 54, which in turn are bolted to the disc 18, itself forming an integral part of the forming head structure. Gears 46 are preferably located between pairs of wheels, as is best shown in Fig. 2 of the drawing, in order that both the gears and the feed wheels may be located radially with respect to the axis of the machine. This necessitates that gears 46 be smaller in diameter than the feed wheels 42 in order not to injure the material being operated upon.

In order to obtain a good feeding grip upon the fabric the feed wheels 42 project through slots in the periphery of the forming head A, and each cooperates with a corresponding pressure roller 44. These are journalled in yokes 56 mounted at the ends of rods 58 reciprocably mounted in bearings 60. Between bearings 60 and yokes 56 there are interposed compression springs 62 which urge the pressure rollers yieldably against the feed wheels or rollers 42. The bearings 60 are distributed about an annular ring 64 which is itself supported upon four upright posts or rods 66 rigidly bolted at 68 to the base 24.

In order to relieve the pressure of the pressure rollers 44 when a new sleeve of fabric is to be started in the machine, means are provided for retracting the pressure rollers and holding them in retracted position. For this purpose each of the rods 58 is provided with a transverse grip or handle 20, and is further provided with a locating or anchor pin 72 designed to fit closely within a slot 74 cut in the end of bearing 60. In normal operation pins 72 are located in slots 74, thereby serving to keep the axes of the pressure rollers 44 horizontal and at the same time permitting reciprocation of rods 58 under the influence of springs 62. However, by pulling the handles 70 outwardly and turning the same, pins 72 will then rest against the ends of the bearings 60, as is indicated at the left side of Fig. 1, thereby keeping the pressure roller in retracted position against the pressure of spring 62.

The cutter C, like the gear 50, is mounted on the tubular drive shaft 30, and is revolved thereby about the inner periphery of the tubular fabric being fed downwardly by the feed means B. The cutter preferably is in the form of a rotary cutter 80 which is rotated at a very high speed by a small high speed motor 82 connected to the rotary cutter 80 through a flexible drive shaft 84. The cutter 80 is journalled in a yoke 86 mounted on a rod 88, which is adjustable in a boss 90 should it be desired to alter the radius of revolution of the cutter, as in case of a change in diameter of the rotary blade itself, and which is also adjustable to permit the angle of the plane of the cutter blade to be made equal to the slope or bias of the cut. Motor 82 is mounted on a bracket fixed to tubular shaft 30, as shown, so as to revolve with the rotary cutter, thereby greatly simplifying the problem of driving the same at the desired high speed.

To establish a power supply circuit for energizing motor 82 slip rings 92 and 94 are insulatedly mounted upon drive shaft 30 and are connected to motor 82 through leads 96. Stationary brushes 98 and 100 contact respectively with slip rings 92 and 94, and are fixedly and insulatedly mounted upon pedestal 38. Leads 102 run from brushes 98 and 100 downwardly along pedestal 38 and out from base 24 to any ordinary power supply line, including, of course, an intermediate switch for controlling the flow of current to the motor.

Tubular drive shaft 30 has fixed thereto at its lower end a worm gear 104 meshing with a worm 106, itself fixed to a pulley shaft 108 carrying a pulley 110, which may be belted to any suitable driving motor for the machine.

The finished strip of material falls away from the tubular material by gravity, but the point at which the material is falling away at any instant revolves about the axis of the machine, following the cutter. To receive and protect the finished material a storage magazine D is provided, which preferably is annular in configuration and is located about the axis of the machine and beneath the forming head thereof, as is clearly shown in Fig. 1 of the drawing.

To facilitate removal of the finished material from the machine the magazine D is mounted for free rotation. In the present case each of the posts 66 carries at its lower end a freely rotatable flanged collar 112, and the magazine, the peripheral edge of which is made truly circular, rests upon these collars. When it is desired to remove the finished strip of bias cut material from the magazine D the upper or finally cut end thereof is grasped and pulled from the machine between any two of the posts 66. Magazine D spins freely during this withdrawal of the fabric therefrom, thereby preventing the fabric from becoming entangled during its extraction. The inner wall 114 of the magazine is made extra high, as shown, in order to protect the fabric from rubbing against the pedestal 38 while it is being withdrawn from the magazine.

The construction and operation of my invention will, it is believed, be clear from the foregoing description thereof. A tubular fabric is drawn over the forming head A, and is pulled downwardly until the lower edge thereof passes the feed rollers 42. The pressure rollers 44 are then released to engage the feed rollers. Motor 82 is next energized and power applied through pulley 110 to the machine, whereupon the tubular fabric will be continuously cut on the bias until consumed, the resulting bias strip of material meanwhile falling in circular convolutions in the annular magazine D. When the cutting operation is finished the machine may be stopped and the upper end of the bias cut strip drawn from the magazine, the latter spinning freely to facilitate the removal of the strip.

It will be apparent that while I have shown and described my invention in the preferred form, many changes and modifications may be made in the structure disclosed without departing from the spirit of the invention, defined in the following claims.

I claim:

1. A bias cutting machine comprising means to support and longitudinally feed a tubular fabric, rotary cutting means, means to rotate the cutting means, and means including a rotatable radius arm mounted on and extending transversely of a rotatable shaft arranged coaxially with the tubular fabric in order to revolve the cutting means about the axis of the tubular fabric within the periphery thereof, the rates of longitudinal movement of the fabric and of revolution of the cutting means being properly adjusted to obtain the desired bias.

2. A compact bias cutting machine for cutting a wide web of material on the bias, comprising a cylindrical forming head one end of which is rounded so that a tubular material may be drawn thereover, supporting means at the other end of said forming head, feed rollers and cooperating pressure rollers distributed around the periphery of the forming head, driving means for actuating the feed rollers, a cutter, and means including a rotatable radius arm mounted on and extending transversely of a rotatable shaft arranged coaxially with the tubular fabric in order to revolve the cutter within the tubular fabric for cutting the periphery thereof.

3. A bias cutting machine comprising a cylindrical forming head supported with its axis in a vertical direction, the upper end of said forming head being rounded so that a tubular material may be drawn downwardly thereover, the lower end of said forming head being arranged with axial supporting means for the same, feed rollers arranged inside of the periphery of the forming head, mating pressure rollers distributed outside the periphery of the forming head for cooperation with the feed rollers, driving means within the forming head for actuating the feed rollers, a rotary cutting knife, a motor for rotating the same, and means including a rotatable radius arm mounted on and extending transversely of a rotatable shaft arranged coaxially with the tubular fabric in order to revolve the cutter and motor within the tubular fabric for cutting the periphery thereof, the rate of longitudinal feed of the tubular fabric and of revolution of the cutter about the periphery thereof being so related as to obtain the desired bias.

4. A bias cutting machine comprising a support, a fixed shaft extending therefrom, a cylindrical forming head fixed to the end of said shaft, said head being rounded to permit a tubular fabric to be drawn thereover, a tubular drive shaft rotatably mounted on said fixed shaft, means for rotating the drive shaft, and a cutter mounted on said drive shaft in order to revolve the cutter about the inner periphery of the tubular fabric.

5. In a bias cutting machine, supporting and feeding means comprising a support, a fixed shaft extending therefrom, a cylindrical forming head fixed to the end of said shaft, said head being rounded to permit a tubular fabric to be drawn thereover, feed wheels supported about the inner periphery of said head, a tubular drive shaft rotatably mounted on said fixed shaft, means for rotating the drive shaft, and gearing between said drive shaft and said feed wheels for rotating the feed wheels in order to draw the fabric over said forming head.

6. A bias cutting machine comprising a base, a fixed vertical shaft extending upwardly therefrom, a cylindrical forming head fixed to the upper end of said shaft, said head being rounded to permit a tubular fabric to be drawn downwardly thereover, feed wheels supported about the inner periphery of said forming head, a tubular drive shaft rotatably and concentrically mounted on said fixed upright shaft, means for rotating the drive shaft, gearing between said drive shaft and said feed wheels for rotating the feed wheels in order to draw the fabric downwardly over said forming head, a rotary cutter and means for rotating the same mounted on said drive shaft in order to revolve the cutter about the inner periphery of the tubular fabric.

7. A bias cutting machine comprising a forming head supported with its axis in a vertical direction, feed means to feed a tubular material downwardly thereover, a cutter, means for revolving the cutter relative to the tubular fabric for cutting the periphery thereof, and an annular storage magazine located coaxially with the forming head and beneath the forming head and cutter for receiving the cut material, said storage magazine being movable to facilitate ready withdrawal of the cut material therefrom.

8. A bias cutting machine comprising a forming head supported with its axis in a vertical direction, feed means to feed a tubular material downwardly thereover, a cutter, means for revolving the cutter relative to the tubular fabric for cutting the periphery thereof, and an annular storage magazine located coaxially with the forming head end beneath the forming head and cutter for receiving the cut material, said storage magazine being freely rotatable in order to facilitate withdrawal of the cut strip of material therefrom.

9. A bias cutting machine comprising a cylindrical forming head supported with its axis in a vertical direction, the upper end of said head being rounded so that a tubular material may be drawn downwardly thereover, the lower end of said head being arranged with supporting means for the same, feed means for feeding the tubular material past the head, a cutter, means for revolving the cutter within the tubular fabric for cutting the periphery thereof, and an annular storage magazine located beneath the forming head for receiving the cut material.

10. A bias cutting machine comprising a cylindrical forming head supported with its axis in a vertical direction, the upper end of said head being rounded so that a tubular material may be drawn downwardly thereover, the lower end of said head being arranged with axial supporting means for the same, feed rollers and cooperating pressure rollers distributed around the periphery of the forming head, means to drive the feed rollers, a rotary cutter, means for revolving the cutter within the tubular fabric for cutting the periphery thereof, and an annular storage magazine located around the axial supporting means beneath the forming head for receiving the cut material, said storage magazine being freely rotatable in order to facilitate withdrawal of the cut strip of material therefrom.

11. A bias cutting machine comprising a cylindrical forming head supported with its axis in a vertical direction, the upper end of said head being rounded so that a tubular material may be drawn downwardly thereover, the lower end of said head being arranged with axial supporting means for the same, feed rollers arranged inside of the periphery of the forming head, mating pressure rollers distributed outside the periphery of the forming head for cooperation with the feed rollers, driving means within the forming head for actuating the feed rollers, a rotary cutter, a motor for rotating the same, means for revolving the cutter and motor within the tubular fabric for cutting the periphery thereof, and an annular storage magazine located around the axial supporting means beneath the forming head for receiving the cut material, said storage magazine being freely rotatable in order to facilitate withdrawal of the cut strip of material therefrom.

12. A bias cutting machine comprising a base, a fixed vertical shaft extending upwardly therefrom, a cylindrical forming head fixed to the upper end of said shaft, said head being rounded to permit a tubular fabric to be drawn downwardly thereover, means to feed the fabric downwardly over said forming head, a tubular drive shaft rotatably mounted on said fixed upright shaft, means for rotating the drive shaft, a cutter mounted on said drive shaft in order to revolve the cutter about the inner periphery of the tubular fabric, and an annular storage magazine supported about the axis of support of the forming head for receiving the cut strip of material.

13. A bias cutting machine comprising a base, a fixed vertical shaft extending upwardly therefrom, a cylindrical forming head fixed to the upper end of said shaft, said head being rounded to permit a tubular fabric to be drawn downwardly thereover, means to feed the fabric downwardly over said forming head, a tubular drive shaft rotatably mounted on said fixed upright shaft, means for rotating the drive shaft, a rotary cutter and means for rotating the same mounted on said drive shaft in order to revolve the cutter about the inner periphery of the tubular fabric, an annular storage magazine located about the axis of support of the forming head for receiving the cut strip of material, and means for freely rotatably supporting said magazine in order to facilitate withdrawal of the cut strip of material therefrom.

14. A bias cutting machine comprising a base, a fixed vertical shaft extending upwardly therefrom, a cylindrical forming head fixed to the upper end of said shaft, said head being rounded to permit a tubular fabric to be drawn downwardly thereover, feed means supported about the inner periphery of said forming head, a tubular drive shaft rotatably mounted on said fixed upright shaft, means for rotating the drive shaft, gearing between said drive shaft and said feed wheels for rotating the feed wheels in order to draw the fabric downwardly over said forming head, a cutter, means to revolve the cutter relative to the tubular fabric, an annular storage magazine located about the axis of support of the forming head and below said forming head and cutter for receiving the cut strip of material, and means for freely rotatably supporting said magazine in order to facilitate withdrawal of the cut strip of material therefrom.

15. A bias cutting machine comprising a base, a fixed vertical shaft extending upwardly therefrom, a cylindrical forming head fixed to the upper end of said shaft, said head being rounded to permit a tubular fabric to be drawn downwardly thereover, feed wheels supported about the inner periphery of said forming head, a tubular drive shaft rotatably and concentrically mounted on said fixed upright shaft, means for rotating the drive shaft, gearing between said drive shaft and said feed wheels for rotating the feed wheels in order to draw the fabric downwardly over said forming head, a rotary cutter and means for rotating the same mounted on said drive shaft in order to revolve the cutter about the inner periphery of the tubular fabric, an annular storage magazine located about the axis of support of the forming head for receiving the cut strip of material, and means for freely rotatably supporting said magazine in order to facilitate withdrawal of the cut strip of material therefrom.

16. A bias cutting machine comprising a base, a fixed vertical shaft extending upwardly therefrom, a cylindrical forming head fixed to the upper end of said shaft, said head being rounded to permit a tubular fabric to be drawn downwardly thereover, feed wheels supported about the inner periphery of said forming head, a tubular drive shaft rotatably and concentrically mounted on said fixed upright shaft, means for rotating the drive shaft, gearing between said drive shaft and said feed wheels for rotating the feed wheels in order to draw the fabric downwardly over said forming head, a rotary cutter and means for rotating the same mounted on said drive shaft in order to revolve the cutter about the inner periphery of the tubular fabric, an annular storage magazine located about the axis of support of the forming head for receiving the cut strip of material, means for freely rotatably supporting said magazine in order to facilitate withdrawal of the cut strip of material therefrom, a plurality of upright supporting pillars extending from said base, and pressure rollers supported thereon arranged to cooperate with the aforesaid feed rollers.

17. A compact bias cutting machine for cutting a wide web of material on the bias, said machine comprising means to support and longitudinally feed a tubular fabric, a rotatable shaft arranged coaxially with said means and tubular fabric, a rotatable arm mounted on and extending generally transversely of the rotatable shaft and within the tubular fabric, and a cutter mounted at the end of said arm, whereby rotation of the shaft causes revolution of the cutter about the axis of the tubular fabric and within the periphery thereof.

Signed at New York in the county of New York and State of New York this 20th day of November A. D. 1929.

JULIUS PEARLMAN.